(12) United States Patent
DeGevay

(10) Patent No.: US 6,796,398 B1
(45) Date of Patent: Sep. 28, 2004

(54) ROUND-CIRCULAR VEHICLE AND METHOD THEREFOR

(76) Inventor: Francois M. DeGevay, 1000 Caballo Blvd., Las Vegas, NV (US) 89014

(*) Notice: Subject to any disclaimer, the term of this patent is extended or adjusted under 35 U.S.C. 154(b) by 0 days.

(21) Appl. No.: 10/426,104

(22) Filed: Apr. 29, 2003

(51) Int. Cl.$^7$ .............................................. B63D 21/00
(52) U.S. Cl. ..................... 180/311; 180/21; 280/781; 296/185
(58) Field of Search ................... 180/21, 311; 280/781; 296/181.1, 181.2, 185, 205

(56) References Cited

U.S. PATENT DOCUMENTS

| 675,876 | A | * | 6/1901 | Anderson | ................... | 280/92 |
| 3,325,180 | A | * | 6/1967 | Bardi et al. | ................. | 280/259 |
| 4,237,990 | A | * | 12/1980 | La | ............................. | 180/7.1 |
| 4,640,527 | A | * | 2/1987 | Taylor | ........................ | 280/781 |
| 5,725,270 | A | * | 3/1998 | Fleishman | ............... | 296/181.1 |

FOREIGN PATENT DOCUMENTS

| FR | 1564815 | * | 3/1968 | ................... | 180/21 |
| FR | 2398655 | * | 3/1979 | ................. | 296/185 |
| GB | 841871 | * | 7/1960 | ................... | 180/21 |

* cited by examiner

Primary Examiner—Eric Culbreth
(74) Attorney, Agent, or Firm—Harry M. Weiss; Jeffrey Weiss; Weiss, Moy & Harris, P.C.

(57) ABSTRACT

A motroized vehicle has a circular platform. A hemispherical frame is coupled to the platform. A front axle and wheel assembly is rotatably coupled to a front section of the hemispherical frame. A rear axle and wheel assembly is rotatably coupled to a rear section of the hemispherical frame. A motor is coupled to the rear axle and wheel assembly for powering the vehicle. Control devices are coupled to the motor and the front and rear axle and wheel assembly for controlling operation of the vehicle.

2 Claims, 2 Drawing Sheets

ROUND-CIRCULAR VEHICLE AND METHOD THEREFOR

BACKGROUND OF THE INVENTION

1. Field of the Invention

This invention relates generally to motorized vehicles and, more specifically, to a-round circular motorized vehicle that overcomes many of the problems associated with current vehicles.

2. Description of the Prior Art

In most large metropolitan areas, traffic congestion and parking is a common problem. Because of this, many people have chosen not to frequent these areas. Even when parking is available, many people have a difficult time parking their vehicle on the street.

Street parking generally requires one to parallel park Unfortunately, many people have a difficult time parallel parking their vehicle. Parallel parking is difficult for many reasons. One reason is that the space available for parking is often just large enough for the vehicle to fit. Furthermore, many people are not able to properly drive the vehicle in between two parked cars. Another reason is that on a busy skeet the traffic is so bad that one is generally unable to back up into the space to parallel park the vehicle.

Many people feel who live in congested areas drive smaller cars to avoid some of the above parking problems. Many people feel that it's easier to park and park a smaller vehicle. While this may be true, smaller vehicles have their own problems. Smaller vehicles are not as safe to drive. Smaller vehicles tend to suffer mare damage in an accident than larger vehicles. Furthermore, drivers have less visibility when driving a smaller vehicle than when driving a larger vehicle which may be raised higher off of the ground.

Therefore, a need existed to provide an improved motorized vehicle. The improved motorized vehicle will overcome many of the problems associated with prior art vehicles. The improved motorized vehicle will be safer to drive. The improved motorized vehicle will also be easier to parallel park.

SUMMARY OF THE INVENTION

In accordance with one embodiment of the present invention, it is an object of the present invention to provide an improved motorized vehicle.

It is another object of the present invention to provide an improved motorized vehicle that will overcome many of the problems associated with prior art vehicles.

It is still another object of the present invention to provide an improved motorized vehicle that will be safer to drive than prior art vehicles.

It is another object of the present invention to provide an improved motorized vehicle that will be easier to parallel park than prior art vehicles.

BRIEF DESCRIPTION OF THE EMBODIMENTS

In accordance with one embodiment of the present invention, a motorized vehicle is disclosed. The motorized vehicle has a circular platform. A hemispherical frame is coupled to the platform. A front axle and wheel assembly is rotatably coupled to a front section of the semi-spherical frame. A rear axle and wheel assembly is rotatably coupled to a rear section of the hemispherical frame. A motor is coupled to the rear axle and wheel assembly for powering the vehicle. Control devices are coupled to the motor and the front and rear axle and wheel assembly for controlling operation of the vehicle.

In accordance with another embodiment of the present invention, a motorized vehicle is disclosed. The motorized vehicle has a circular platform. A hemispherical frame is coupled to the platform. A front axle and wheel assembly is rotatably coupled to a front section of the hemispherical frame. A rear axle and wheel assembly is rotatably coupled to a rear section of the hemispherical frame. A motor is coupled to the rear axle and wheel assembly for powering the vehicle. Control devices are coupled to the motor and the front and rear axle and wheel assembly for controlling operation of the vehicle. A protective cover is coupled to the hemispherical frame for protecting individuals riding within the vehicle from the environment. A plurality of seats are coupled to the circular platform for allowing the individuals riding in the vehicle a place to sit. A lighting system is coupled to the circular frame of the vehicle.

In accordance with another embodiment of the present invention, a method of providing a motorized vehicle is disclosed. The method comprises the steps of: providing a circular platform; providing a hemispherical frame coupled to the platform; providing a front axle and wheel assembly rotatably coupled to a front section of the frame; providing a rear axle and wheel assembly rotatably coupled to a rear section of the frame; providing a motor coupled to the rear axle and wheel assembly for powering the vehicle; and providing control devices coupled to the motor and the front and rear axle and wheel assembly for controlling operation of the vehicle.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings.

DETAILED DESCRIPTION OF THE PREFERRED EMBODIMENT

Figure 1:
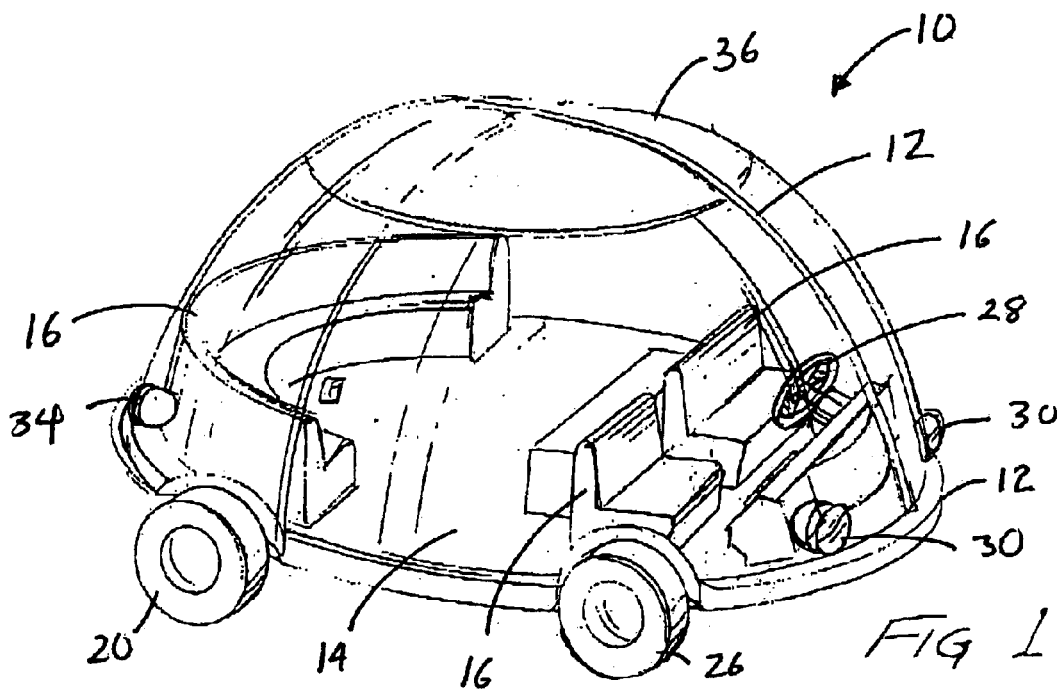
FIG. 1 is an elevated perspective view of a round circular motorized vehicle of the present invention.
Figure 2:
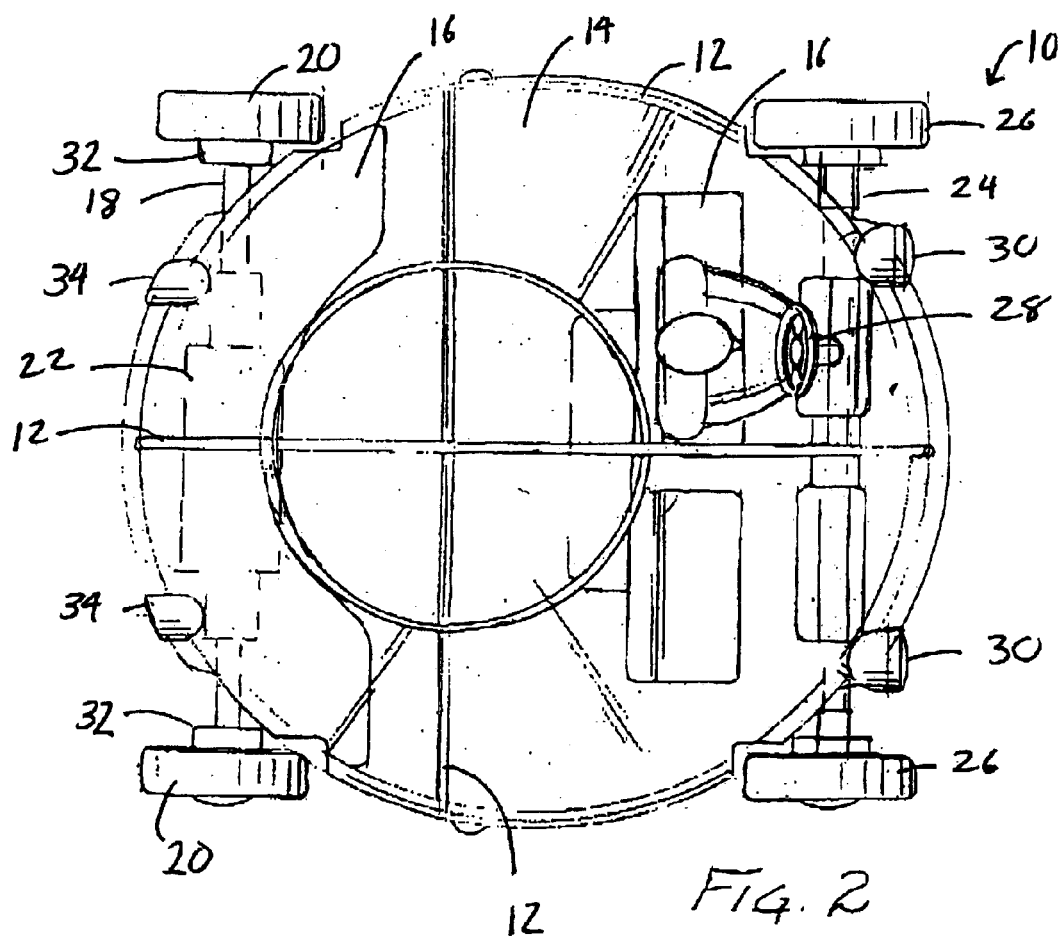
FIG. 2 is a top view of the round circular motorized vehicle depicted in FIG. 1.
Figure 3:
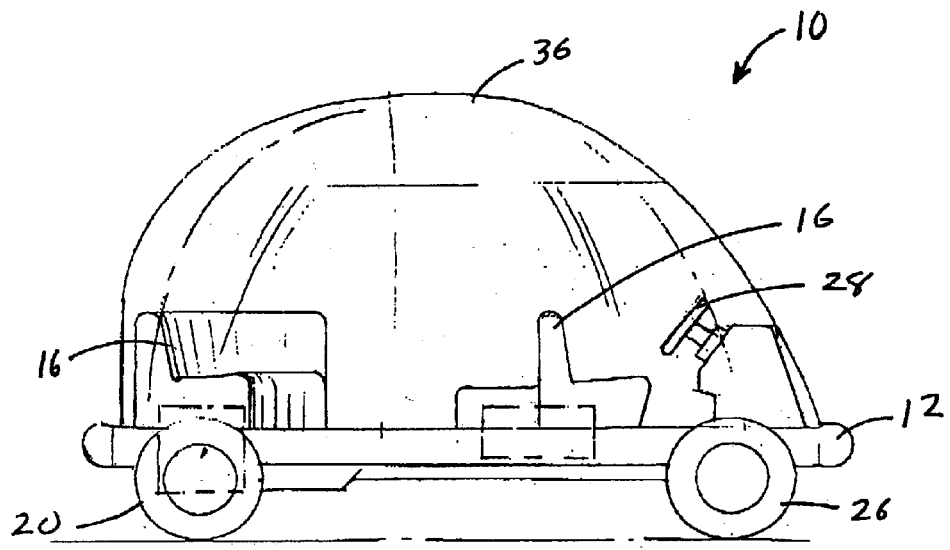
FIG. 3 is a side view of the round circular motorized vehicle depicted in FIG. 1.

Referring to the Figures, a round circular motorized vehicle 10 (hereinafter vehicle 10) is shown. The vehicle 10 has many advantages over prior art vehicles. The vehicle 10 while compact, is very safe to drive. The vehicle 10 has no blind spots. Thus, the vehicle 10 allows one to have an unhindered view while driving. Furthermore, because of compact nature of the vehicle 10, the vehicle 10 is easy to park.

The vehicle 10 is comprised of a frame 12. The frame 12 is hemispherical in nature. The nature of the frame 12 will prevent any type of loss of center of gravity thereby preventing roll over accidents by the vehicle 10. The center of gravity lies in the center of the vehicle 10 thereby providing greater stability and ease for driving. The frame 12 may be of any dimension. In accordance with one embodiment of the present invention, the frame is approximately eight to nine feet in diameter. The frame 12 is generally made from metal tubing. In general, the frame 12 is made from steel piping. The steel piping may be of any diameter. However, two inch steel piping seems to give the vehicle 10 a good deal of protection from damage due to a collision.

A platform 14 is coupled to the frame 12. The platform 14 is circular in shape and is used to support and hold people on the frame 12 of the vehicle 10. A plurality of seats 16 are coupled to the platform 14. The seats 16 will allow individuals to comfortable sit within the vehicle 10. The seats 16 will generally be padded and upholstered to add to the comfort level of the users. In accordance with one embodiment of the present invention, a semi-circular bench seat is coupled to the platform 14 in the rear of the vehicle 10.

A rear axle 18 is rotatably coupled to a rear section of the frame 12. The rear axle 18 will have a pair of wheels 20 coupled thereto. The rear axle 18 is used to drive the vehicle 10. In order to drive the vehicle 10, the rear axle 18 is directly coupled to a motor 22. The motor 22 will be mounted on the platform 14 directly above the axle 18 Thus, a long drive train is not required. The motor 22 will drive the rear axle causing the rear axle 18 and wheels 20 to rotate thereby driving the vehicle 10. The motor 22 is coupled via a throttle valve to an acceleration pedal. Thus, one can control the speed of the vehicle 10 via tee acceleration pedal. The motor 22 will protrude into the interior of the vehicle 10. However, the seat 16 can be used to hide the motor 22. Noise insulation may be used to dampen the noise of the motor 22. The motor 22 can be an electric motor, a gas motor, diesel motor, or the like. The listing of the above should not be seen as to limit the scope of the present invention.

A front axle 24 is rotatably coupled to a front section of the frame 12. The front axle 24 will have a pair of wheels 26 coupled thereto. The front axle 24 is used to steer the vehicle 10. A steering wheel 28 is coupled to the front axle 24. The steering wheel is located in the interior of the vehicle 10. By rotating the steering wheel 28, one may turn the vehicle 10 in a desired direction.

A pair of driving lights 30 may be coupled to a front section of the vehicle 10. The driving lights 30 are used to provide lighting while driving. The driving lights 30 may be coupled to an alternator which is coupled to the motor 22. Alternatively, the driving lights 30 may be coupled to a battery which may be recharged by the motor or alternator.

A braking system 32 and brake lights 34 are also located on the vehicle 10. The braking system 32 is located on the rear wheels 20. The braking system is used to stop the vehicle 10 from moving. The braking system 32 is generally coupled to a brake pedal which is used to control the braking system 32.

Additional accessories may be mounted on the vehicle 10. For example, a radio, interior lights, seat belts, anti-theft devices, etc. may be located in the interior of the vehicle 10.

A protective cover 36 may be coupled to the frame 12. The protective cover 36 is used to protect individuals riding in the vehicle 10 from the environment. The protective cover 36 is generally made of a clear material to allow one to have a clear 360 degree view around the vehicle 10. The protective cover 36 may have side openings to allow one to enter and exit the vehicle 10. Alternatively, sliding doors may be formed on the protective cover to allow one to enter and exit the vehicle 10.

Figure 4:
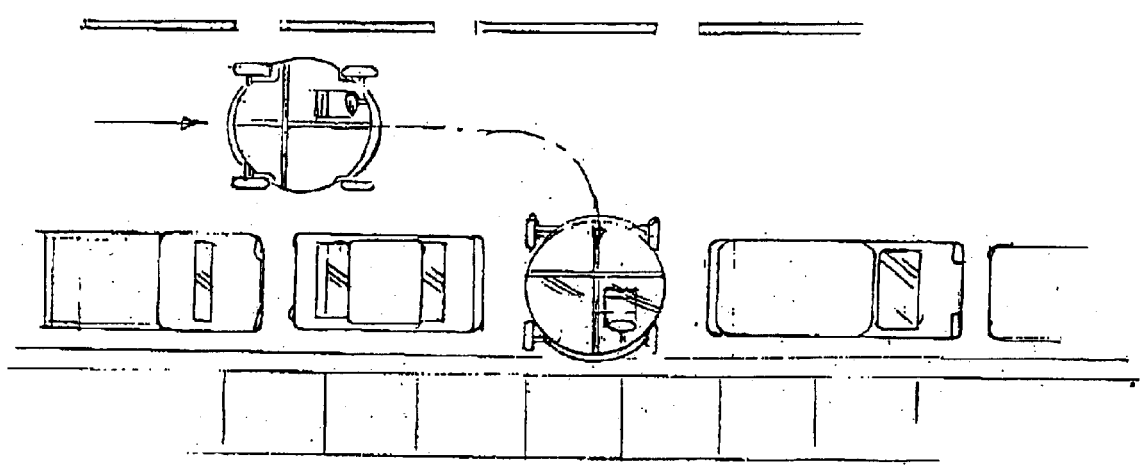
FIG. 4 is an elevated top view depicting the ear of parallel parking the round circular motorized vehicle of the present invention.

As can be seen most clearly in FIG. 4, the vehicle 10 is easy to drive and park. Because of the small profile of the vehicle 10, one can easily park on the street. Parallel parking is not required. The vehicle 10 can simply turn and pull right into an open spot.

While the invention has been particularly shown and desk with reference to preferred embodiments thereof, it will be understood by those skilled in the art that the foregoing and other changes in form and details may be made therein without departing form the spirit and scope of the invention.

What is claimed is:

1. A motorized vehicle comprising, in combination:

a circular platform;

a hemispherical frame coupled to the platform comprising (a) a first semicircular member having two end portions coupled to opposite end portions of the circular platform and having an upwardly extending curved portion to both provide protection for any individual in the vehicle and to provide an interior boundary for an upper portion of the vehicle and (b) a second semicircular member having two end portions coupled to opposite end portions of the circular platform spaced from the two end portions of said first semicircular member and having an upwardly extending curved portion to both provide protection for any individual in the vehicle and to provide an interior boundary for the upper portion of the vehicle, said upwardly extending curved portion of said first semicircular member having an upper portion located proximate an upper portion of said second semicircular member and perpendicular thereto;

a front axle and wheel assembly rotatably coupled to a front section of the frame;

a rear axle and wheel assembly rotatably coupled to a rear section of the frame;

a motor coupled to the rear axle and wheel assembly for powering the vehicle;

control devices coupled to the motor and the front and rear axle and wheel assembly for controlling operation of the vehicle;

a protective cover coupled to exterior portions of the first and second semicircular members of the hemispherical frame for protecting any individual riding within the vehicle from the environment, the protective cover being made of a clear material to allow any individual to have a 360 degree view around the vehicle;

a plurality of seats coupled to the circular platform for allowing individuals riding in the vehicle a place to sit; and a lighting system coupled to the circular frame of the vehicle.

2. The motorized vehicle of claim 1 wherein said first and second semicircular members of said hemispherical frame comprise steel tubing.

* * * * *